US009432748B2

(12) United States Patent
Mehrvar et al.

(10) Patent No.: US 9,432,748 B2
(45) Date of Patent: Aug. 30, 2016

(54) SYSTEM AND METHOD FOR PHOTONIC SWITCHING

(71) Applicant: Huawei Technologies Co., Ltd., Shenzhen (CN)

(72) Inventors: Hamid Mehrvar, Kanata (CA); Eric Bernier, Ottawa (CA)

(73) Assignee: Huawei Technologies Co., LTD., Shenzhen (CN)

( * ) Notice: Subject to any disclaimer, the term of this patent is extended or adjusted under 35 U.S.C. 154(b) by 86 days.

(21) Appl. No.: 14/275,520

(22) Filed: May 12, 2014

(65) Prior Publication Data

US 2014/0334819 A1 Nov. 13, 2014

Related U.S. Application Data

(60) Provisional application No. 61/822,147, filed on May 10, 2013.

(51) Int. Cl.
*H04Q 11/00* (2006.01)

(52) U.S. Cl.
CPC ...... *H04Q 11/0003* (2013.01); *H04Q 11/0005* (2013.01); *H04Q 11/0066* (2013.01); *H04Q 2011/006* (2013.01); *H04Q 2011/0039* (2013.01)

(58) Field of Classification Search
CPC ......... H04Q 11/0003; H04Q 11/0005; H04Q 11/0066; H04Q 2011/006; H04Q 2011/0039
USPC ...................................................... 398/51, 58
See application file for complete search history.

(56) References Cited

U.S. PATENT DOCUMENTS

| 7,593,431 | B1* | 9/2009 | Lo ........................... H04L 47/10 370/528 |
| 2001/0017666 | A1 | 8/2001 | Sani et al. |
| 2004/0033074 | A1* | 2/2004 | Hsu .................... H04Q 11/0005 398/51 |
| 2004/0136385 | A1 | 7/2004 | Xue et al. |
| 2004/0202198 | A1* | 10/2004 | Walker .................. H04J 3/1658 370/474 |
| 2006/0093355 | A1* | 5/2006 | Park .................... H04Q 11/0005 398/31 |
| 2006/0233194 | A1* | 10/2006 | Loprieno .............. H04J 3/1658 370/466 |
| 2010/0135659 | A1* | 6/2010 | Kim ..................... H04L 49/352 398/51 |
| 2012/0099863 | A1 | 4/2012 | Xu et al. |

(Continued)

FOREIGN PATENT DOCUMENTS

| EP | 2458761 A1 | 5/2012 |
| EP | 2562947 A1 | 2/2013 |
| WO | 03060624 A2 | 7/2003 |

OTHER PUBLICATIONS

Kliazovich, D., et al. "On packet concatenation with QoS support for wireless local area networks," IEEE International Conference on Commuincations, vol. 2, May 16-20, 2005, pp. 1395,1399.

(Continued)

*Primary Examiner* — Dalzid Singh
(74) *Attorney, Agent, or Firm* — Slater Matsil, LLP

(57) ABSTRACT

In one embodiment, method of wrapping photonic packets includes receiving, by a node, a first packet and receiving, by the node, a second packet. The method also includes concatenating the first packet and the second packet to produce a concatenated frame, where concatenating the first packet and the second packet includes removing an inter-packet-gap (IPG) between the first packet and the second packet and converting the concatenated frame to a photonic frame, where the concatenated frame is an electrical frame.

24 Claims, 17 Drawing Sheets

(56) References Cited

U.S. PATENT DOCUMENTS

| | | |
|---|---|---|
| 2012/0275783 A1 | 11/2012 | Kitajima et al. |
| 2014/0161451 A1 | 6/2014 | Graves et al. |
| 2014/0269351 A1 | 9/2014 | Graves et al. |
| 2015/0043905 A1* | 2/2015 | Graves ............... H04Q 11/0005 398/25 |
| 2015/0237421 A1* | 8/2015 | Morgan ............. H04Q 11/0005 398/45 |
| 2015/0289035 A1 | 10/2015 | Mehrvar et al. |

OTHER PUBLICATIONS

International Search Report and Written Opinion of Patent Cooperation Treaty (PCT), International Application No. PCT/US2014/037727, Applicant Huawei Technologies Co., Ltd, date of mailing Mar. 27, 2015, 10 pages.

* cited by examiner

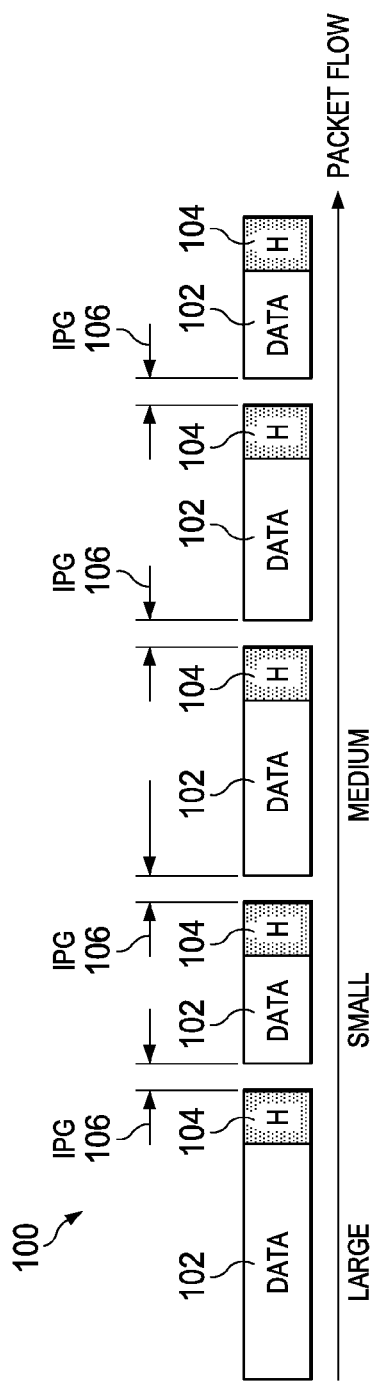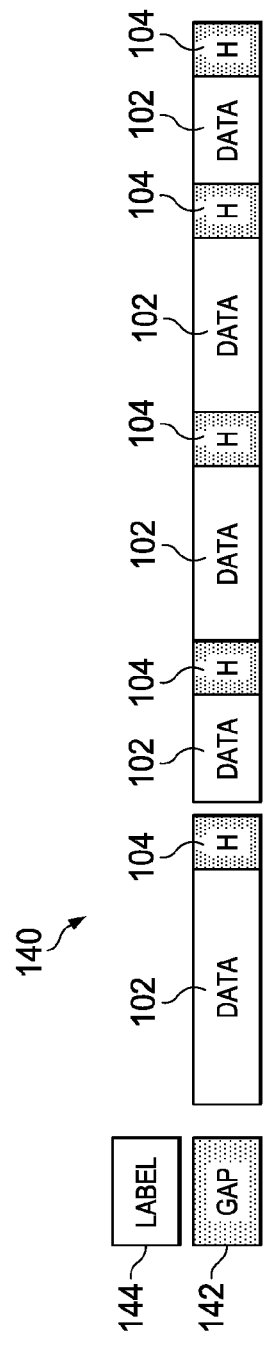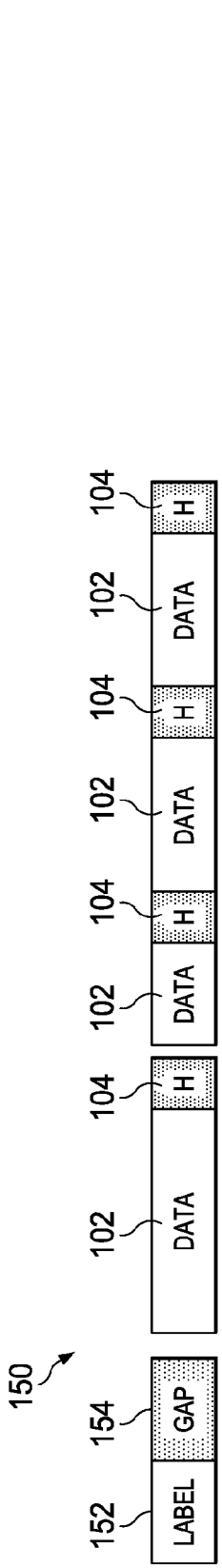

SYSTEM AND METHOD FOR PHOTONIC SWITCHING

This application claims the benefit of U.S. Provisional Application Ser. No. 61/822,147 filed on May 10, 2013, and entitled "System and Method for Wrapping Photonic Packets," which application is hereby incorporated herein by reference.

TECHNICAL FIELD

The present invention relates to a system and method for optical communications, and, in particular, to a system and method for photonic switching.

BACKGROUND

Growth of internet traffic, fueled by the growth in the number of users and by increasing numbers of applications, results in a higher demand for bandwidth. This growth entails larger packet networks with greater switching capabilities. Data centers contain huge numbers of racks of servers, racks of storage devices, and other racks, all of which are interconnected via a massive centralized packet switching resource. In data centers, electrical packet switches are used to route data packets. Electronic packet switching at very high rates involves massive cooling and space costs. Thus, photonic packet switching is desirable.

The racks of servers, storage, and input-output functions contain top of rack (TOR) switches which combine packet streams from their associated servers and/or other peripherals into a smaller number of high speed streams per TOR which are routed to the packet switching core. Also, TORs receive the returning switched streams from that resource and distribute them to servers within their rack. There may be 4×40 Gb/s streams from each TOR to the packet switching core, and the same number of return streams. There may be one TOR per rack, with hundreds to tens of thousands of racks, and hence hundreds to tens of thousands of TORs in a data center.

SUMMARY

An embodiment method of wrapping photonic packets includes receiving, by a node, a first packet and receiving, by the node, a second packet. The method also includes concatenating the first packet and the second packet to produce a concatenated frame, where concatenating the first packet and the second packet includes removing an inter-packet-gap (IPG) between the first packet and the second packet and converting the concatenated frame to a photonic frame, where the concatenated frame is an electrical frame.

An embodiment method of switching wrapped photonic frames includes receiving, by a photonic switching fabric from a first node, a first wrapped photonic frame and determining a destination address of the first wrapped photonic frame. The method also includes setting up a connection in a photonic switch during a gap time between the first wrapped photonic frame and a second wrapped photonic frame and switching the first wrapped photonic frame after setting up the connection in the photonic switch.

An embodiment method of unwrapping wrapped photonic frames includes receiving, by a node, a wrapped photonic frame and unwrapping the wrapped photonic frame to produce a first packet and a second packet, including adding an inter-packet-gap (IPG) between the first packet and the second packet. The method also includes directing the first packet to a destination.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 1 illustrates a packet stream;

FIGS. 2A-B illustrate embodiment wrapped photonic frames;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 3:
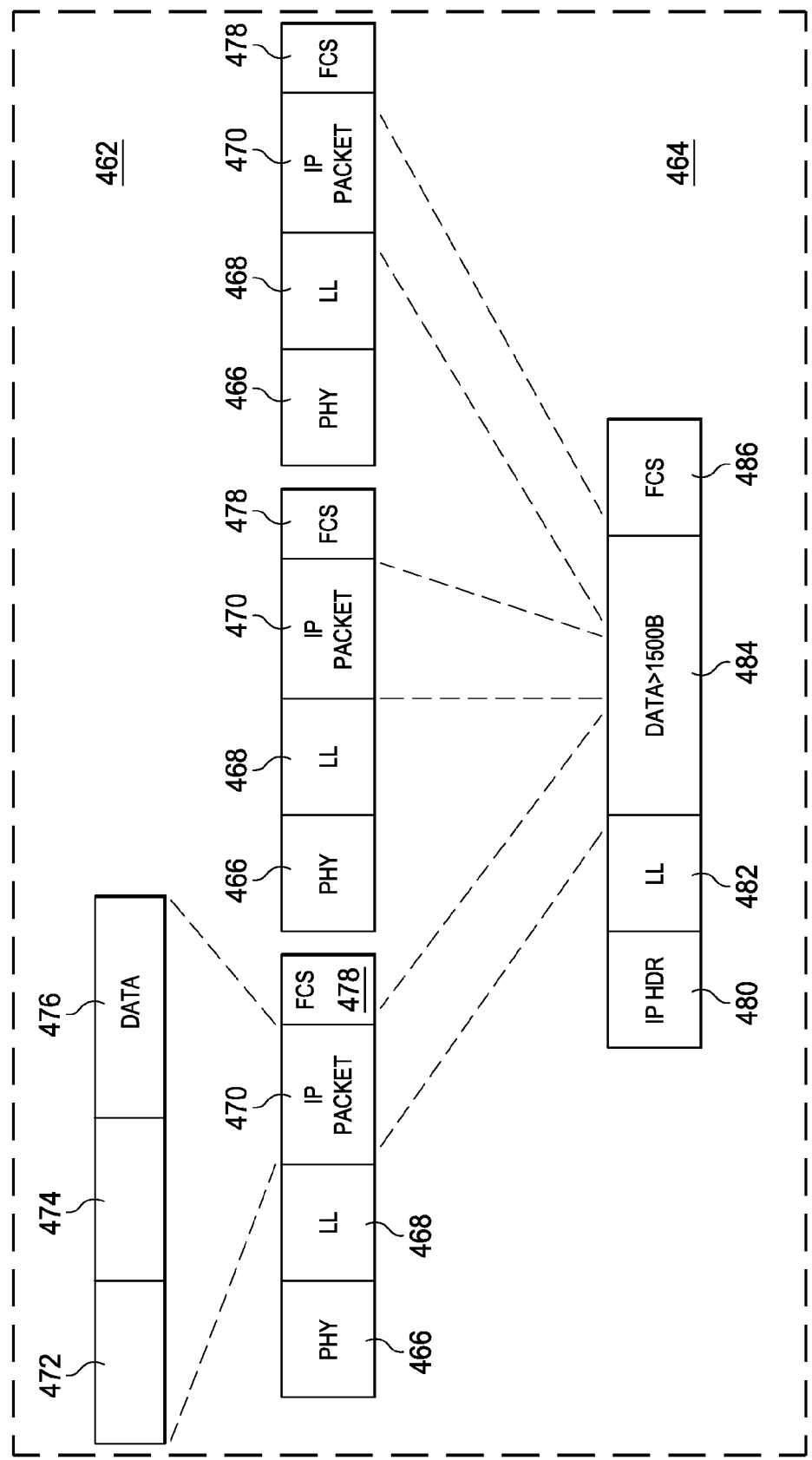
FIG. 3 illustrates the wrapping of a packet stream between a source and destination into a wrapped photonic frame.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an optical space switch, a photonic connection from one physical port to another lasts for the duration of a packet or frame, and is changed between packets or frames. Increasing data rates lead to even smaller switching windows. Some photonic switches have switching times of tens of nanoseconds. FIG. 1 illustrates an example packet stream, packet stream 100, which contains data regions 102, header regions 104, and inter-packet gaps (IPGs) 106 between packets. There are a fixed number of bits in the IPG. In one example, the IPG is 96 bits. For a fixed number of bits, the length of time of the IPG inversely depends on the link rate. For example, a 96 bit IPG is 10 ns at 10 Gb/s, 2.5 ns at 40 Gb/s, 1 ns for 100 Gb/s, and 0.08 ns for 1.28 Tb/s.

An embodiment wrapper and addressing scheme for top-of-rack (TOR) to TOR or TOR group to TOR group communications within a data center wraps packets in a photonic frame. The wrapping scheme is independent of the switching architecture and may be used in both centralized and/or distributed photonic switching architectures. Buffering occurs in the TOR or TOR group in the electrical domain instead of in the optical domain. A routing table of the network addresses other TORs or TOR groups within the data center may be used to wrap packets together which have the same destination.

Packet wrapping may be used in a variety of photonic switching configurations. A photonic switching system may be centralized or distributed. Also, it may be a synchronous or asynchronous system. In an asynchronous system, packets are sent to their destination in a burst, while in a synchronous system, like optical time division multiplexing (OTDM), packets are sent to their destination in a designated timeslot. The functions of wrapping and unwrapping packets may be performed by a node, such as a TOR or TOR group, or by a standalone device, such as a field programmable gate array (FPGA) or by an access or edge node. In an embodiment, wrapped packets are grouped by their destination address for a scalable solution, because the label of a photonic switch is associated with the network hierarchy address of a data center. An embodiment wrapper scheme removes the IPG between individual packets by concatenating packets to form wrapped photonic frames and inserting an appropriate gap time between the wrapped photonic frames. This gap time may be used to set up a photonic switch for switching the photonic frames. In one example, packets belonging to a group address with a particular label based on an addressing scheme are wrapped together. Alternatively, packets are grouped in another way. For example, packets which arrive consecutively from the same TOR or TOR groups are grouped together. In one example, a gap time of 201 ns is used, and 20 packets are in a wrapped packet at a data rate of 10G. In this example, the control time is 101 ns, the switching time is 40 ns, and the clock and data recovery (CDR) time is 60 ns. For a link rate of 100 Gb/s with 32 packets wrapped in a photonic frame, with an IPG of 12 bytes, the sum of the IPGs is 384 bytes, which is equal to the gap time, about 30 ns. The inserted gap has a low overhead, because the IPGs are removed.

FIGS. 2A-B illustrate examples of wrapped photonic frames. In FIG. 2A, wrapped photonic frame 140 contains data regions 102 and header regions 104 concatenated together. Gap 142 is disposed between wrapped photonic frames. Label 144 identifies the wrap and sent over an out-of-band label at a different wavelength than the traffic wavelength, arrives at destination during gap 142. In one example, label 144 is a wavelength encoded address. The headers for the individual packets are similar to those in unwrapped packets. In this example, the time between packets is the gap time, given by:

$$GAP=\Sigma_i IPG_i.$$

In another example illustrated by FIG. 2B, wrapped photonic frame 150 contains data regions 102 and header regions 104 concatenated together. Label 152 and gap 154 are between the wrapped frames. Label 152 is sent in-band, and the time between wrapped packets is the sum of the time of the gap and the label, which is given by:

$$GAP+Label=\Sigma_i IPG_i.$$

In an example addressing scheme, a group of TORs belonging to a network address, for example a subnet or super virtual local area network (VLAN) are associated with a single address. The packets destined to a particular TOR group are wrapped and assigned an optical address indicating the destination TOR group.

In another example, packet concatenation for packets at either the internet protocol (IP) or the link layer of the transmission control protocol (TCP)/IP is used. This may be used for high rates, such as 1.28 Tb/s. FIG. 3 illustrates packet concatenation into a single link layer packet where the payload size is larger than 1500 bytes. Link layer 464 contains physical layer (PHY) header 480, link layer (LL) header 482, payload 484, and frame check sequence (FSC) 486, while IP layer 462 contains PHY header 466, LL header 468, IP packet 470, and FSC 478. IP packet 470 contains IP header 472, TCP header 474, and application data 476. Multiple of IP packets 470 are placed in payload 484, PHY headers 466 are placed in PHY header 480, LL headers 468 go to LL header 482, and FSCs 478 go to FSC 486 in link layer 464. Payload 484 is larger than a maximum transmission unit (MTU) of 1500 bytes.

Figure 4:
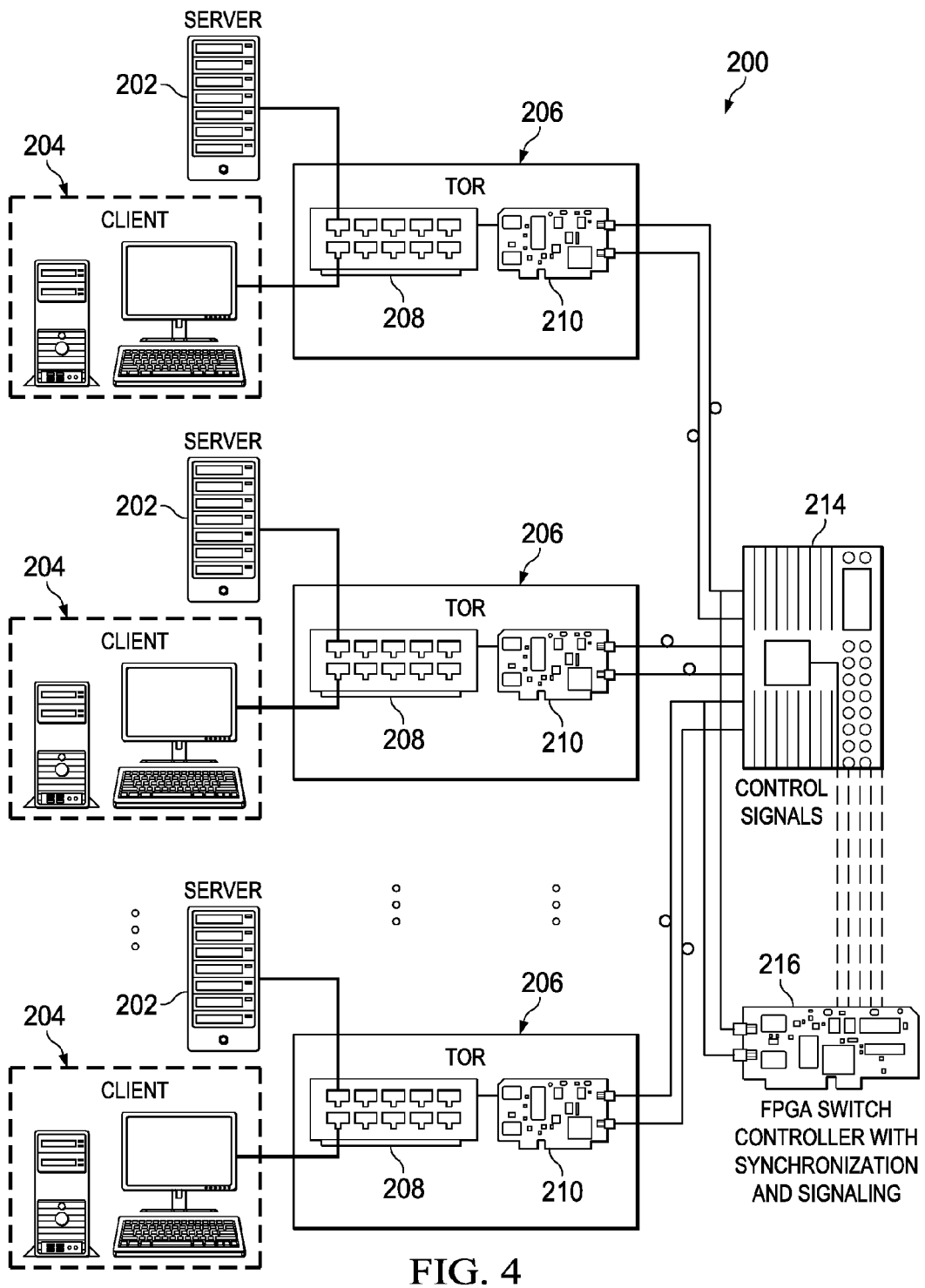
FIG. 4 illustrates an embodiment system for wrapping and switching photonic packets.

FIG. 4 illustrates system 200 for a single core switch data center. Servers 202 and clients 204 are coupled to wrapper blocks 206. As pictured wrapper blocks 206 contain TOR 208 and FPGA 210, which implements photonic frame wrapping. In another example, the photonic frame wrapping is implemented in the TOR, and not as a separate device. The photonic wrapping may be integrated in the TOR without external electronic circuit.

The wrapped frames are passed to photonic switch 214, for example along optical fibers. In one example, the photonic switch is a lead zirconium titanate (PLZT) photonic switch. In another example, the photonic switch is a silicon photonic (SiP) photonic switching fabric.

A portion of the output is tapped off to controller 216. The controller may be, for example, implemented in an FPGA switch controller. The controller implements synchronization and signaling and controls the photonic switch using control signals. In another example, the controller is embedded in the photonic switching fabric.

Figure 5:
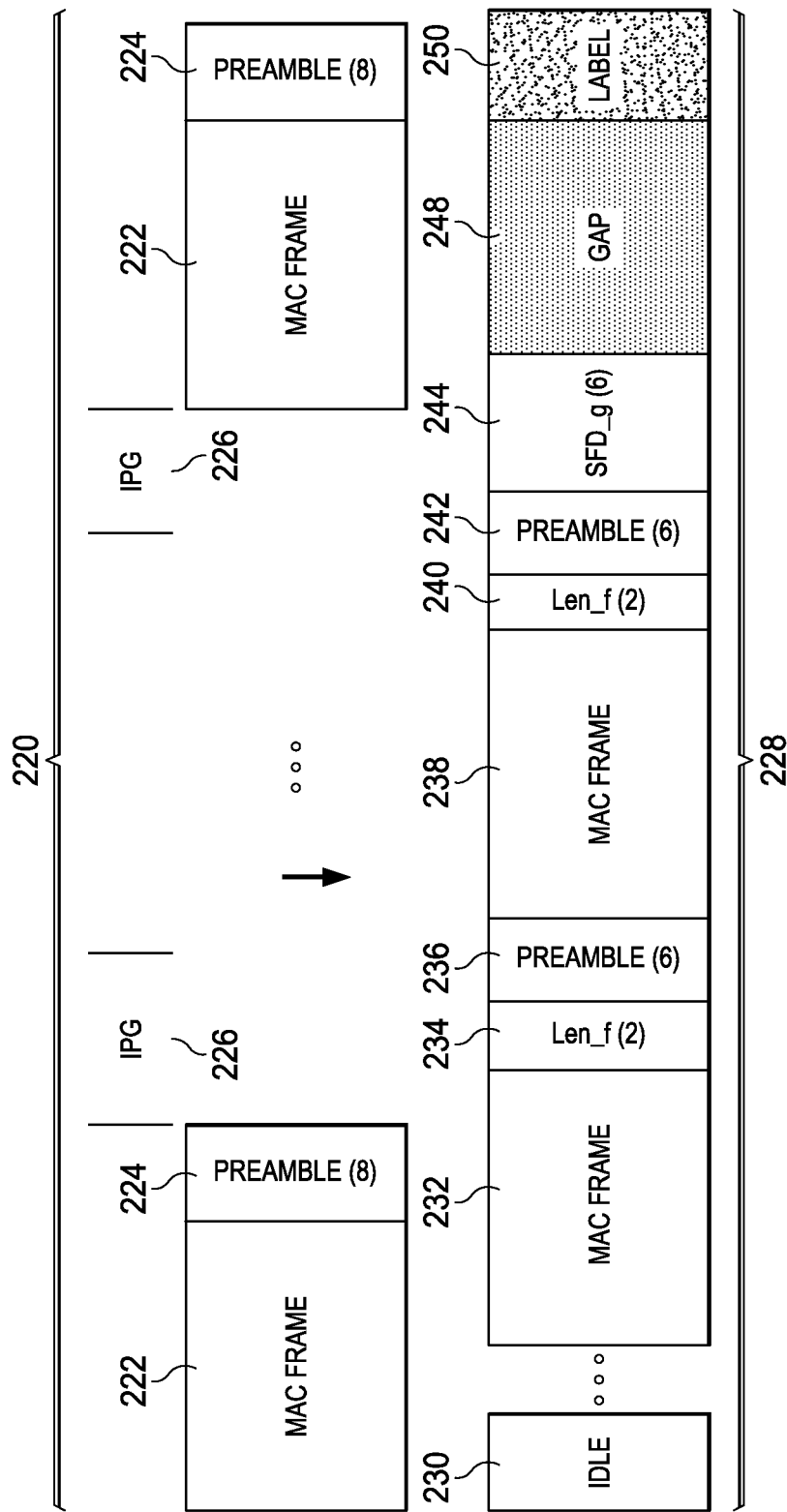
FIG. 5 illustrates the wrapping of another packet stream to a wrapped photonic frame.

FIG. 5 illustrates an embodiment frame wrapping technique. Packets 220 contain media access control (MAC) frame 222, preamble 224, and IPG 226. The preamble, which is 7 bytes, performs synchronization. Wrapped packet 228 contains idle period 230, MAC frame 232, frame length 234, preamble 236, MAC frame 238, frame length 240, preamble 242, start frame delimiter (SFD) 244, gap 248, and label 250. Multiple packets are concatenated in a single wrapped frame. The IPGs between the packets are removed, and a gap and label are placed between the wrapped frames.

Figure 6:
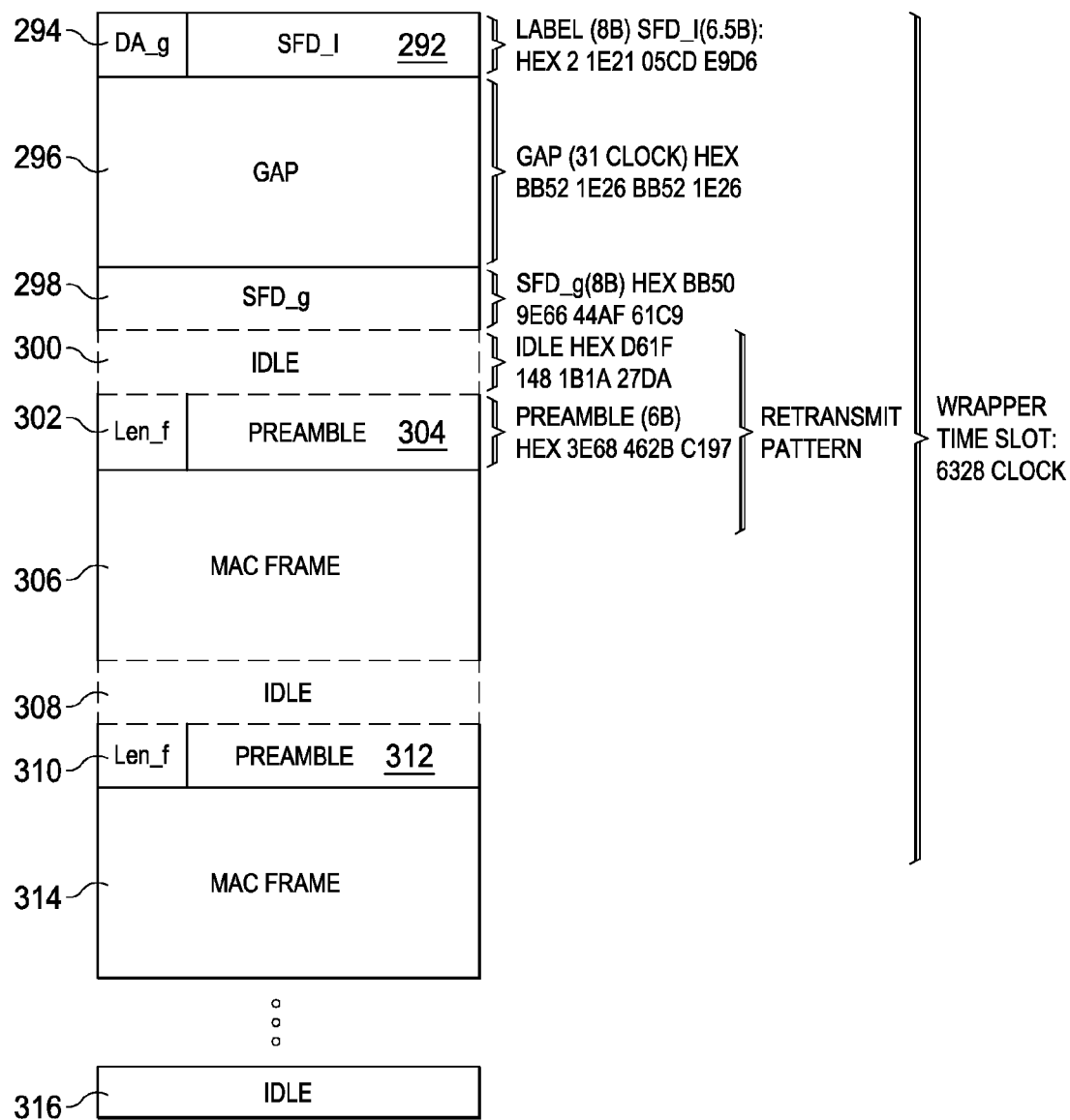
FIG. 6 illustrates another embodiment wrapped photonic frame.

FIG. 6 illustrates an example of a wrapped photonic frame in a synchronous slotted system. The wrapper time slot is 6328 clock cycles. The label contains destination address (DA) 294 and SFD 292. Gap 296 is 31 clock cycles. There is idle period 300, length of frame (len_f) 302, preamble 304, and MAC frame 306, which constitute the retransmit pattern of other MAC frames in the wrapper before the clock cycle of wrapper time slot is exhausted. Len_f indicates the number of bytes in the frame, for use in determining whether there is an error. After the retransmit pattern is idle period 308, len_f 310, preamble 312, MAC frame 314, and idle period 316.

Figure 7:
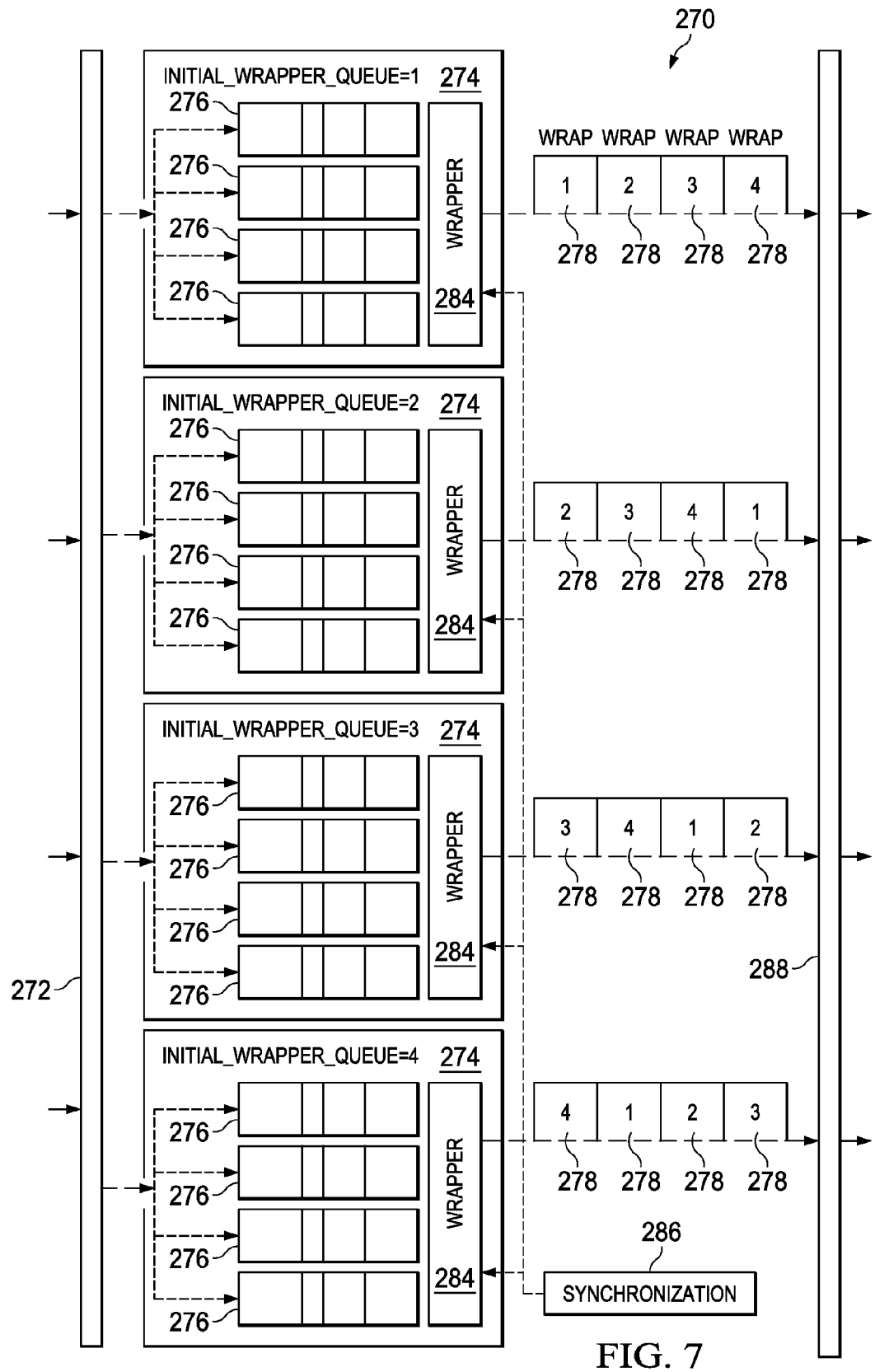
FIG. 7 illustrates an embodiment system for wrapping packets in synchronous time slot systems.

FIG. 7 illustrates system 270 for wrapping packets. System 270 is a 4×4 exchange, with four timeslots in each lane. In this example, wrapping is performed synchronously. Initially, unwrapped packets are received by input block 272. Input block 272 reads the destination address of the packet and routes the packet to the correct buffer for that destination address.

The unwrapped packets proceed to wrapper blocks 274. In wrapper blocks 274, the unwrapped packets are separated by destination. For example, unwrapped packets may be separated by destination TOR group or destination TOR. The separated packets are placed in buffers 276. There is a separate buffer for each destination. Then, packets 276 from the buffers are read out and wrapped by wrappers 284. This is coordinated by synchronization block 286. A synchronization signal from synchronization block 286 indicates that the wrapped packets are synchronously read out from wrappers 284. The wrapping and transmission of the packets are staggered to avoid contention. For example, of the four wrappers 284, one outputs a wrapped photonic frame for output 3, one outputs a wrapped photonic frame for output 4, one outputs a wrapped photonic frame for output 1, and one outputs a wrapped photonic frame for output 2.

The wrapped frames are then transmitted by output block 288 to be sent for photonic switching. Block 288 are transceivers which convert electrical signals to optical signals.

Figure 8A:
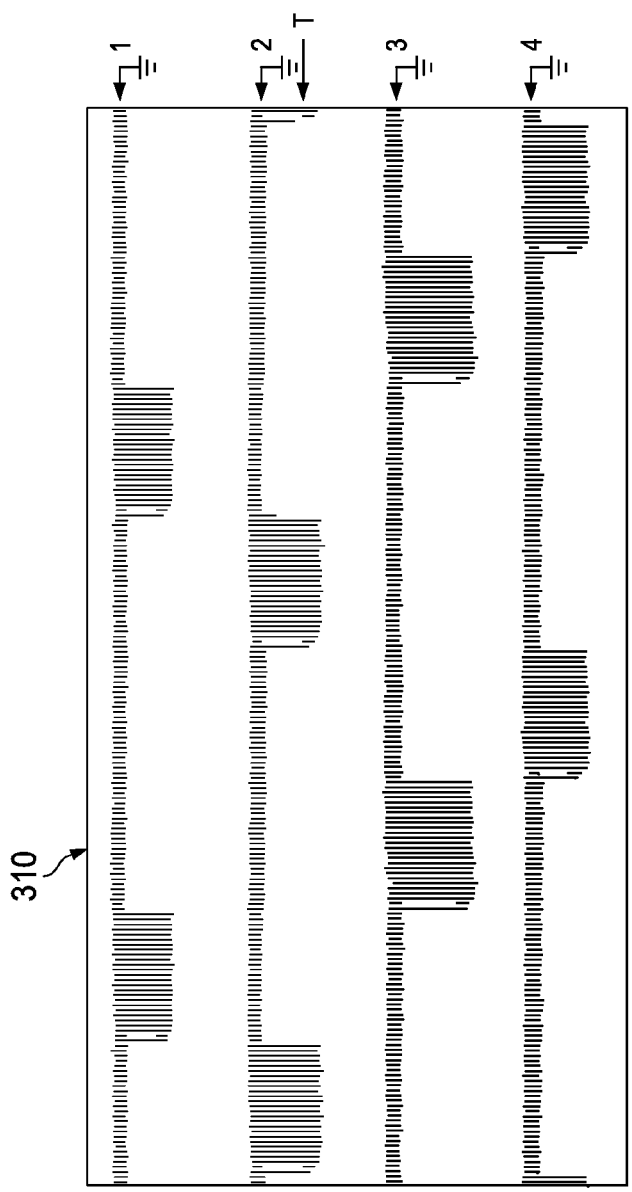
FIGS. 8A-D illustrate waveforms, an eye diagram, and a wrapped photonic packet for wrapping and switching photonic packets.

FIGS. 8A-D illustrate results using a photonic frame wrapping implemented by emulating a wrapped frame with one packet per frame. A server sends Ethernet frames with four different destination MAC addresses, each destined to a different photonic output port of a photonic switch. FIG. 8A illustrates graph 310 with the frame waveform on the four output ports of the photonic switch. The photo-receiver voltage polarity is inverted, with horizontal lines when there is no light and the waveforms when there are switched frames.

Figure 8B:
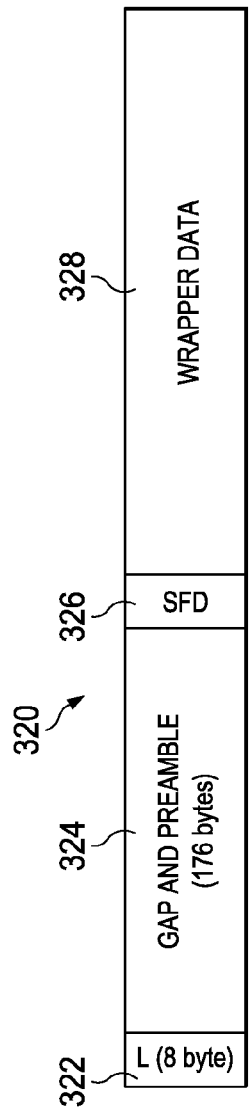

FIG. 8B illustrates wrapped photonic frame 320. Photonic frame 320 contains label 322, which is 8 bytes, gap and preamble 324, which is 176 bytes, SFD 326, and MAC frame 328, which is 1470 bytes. Label 322 indicates the destination address. Gap and preamble 324 contains the gap for photonic switching and the preamble. SFD 326 is used to detect errors.

Figure 8C:
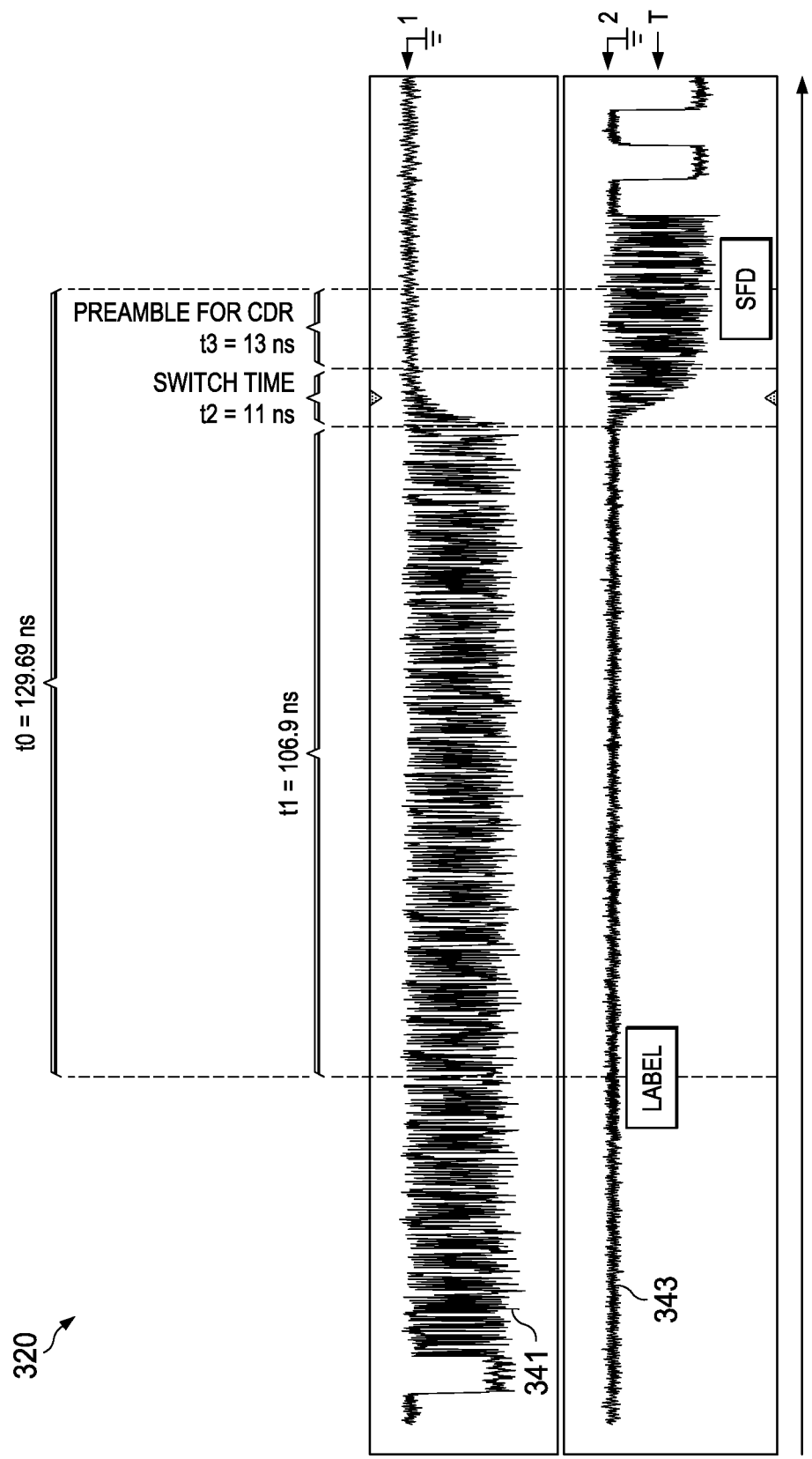

FIG. 8C illustrates a graph with a detailed output frame waveform of two output ports of a photonic switch. Curve 341 shows the completion of a photonic frame transmission, and curve 343 starts sending a preamble and photonic label. Time t0 represents the total time for the label, gap, preamble, and SFD. Time t1 represents the earliest time that the process of a label can be started before frame transmission is completed. Time t1 is 106.9 ns, the switch response time t2 is 12 ns, residual preamble for receiver synchronization is 15 ns, the preamble for CDR, t3, is 13 ns, and the SFD time is 12 ns.

Figure 8D:
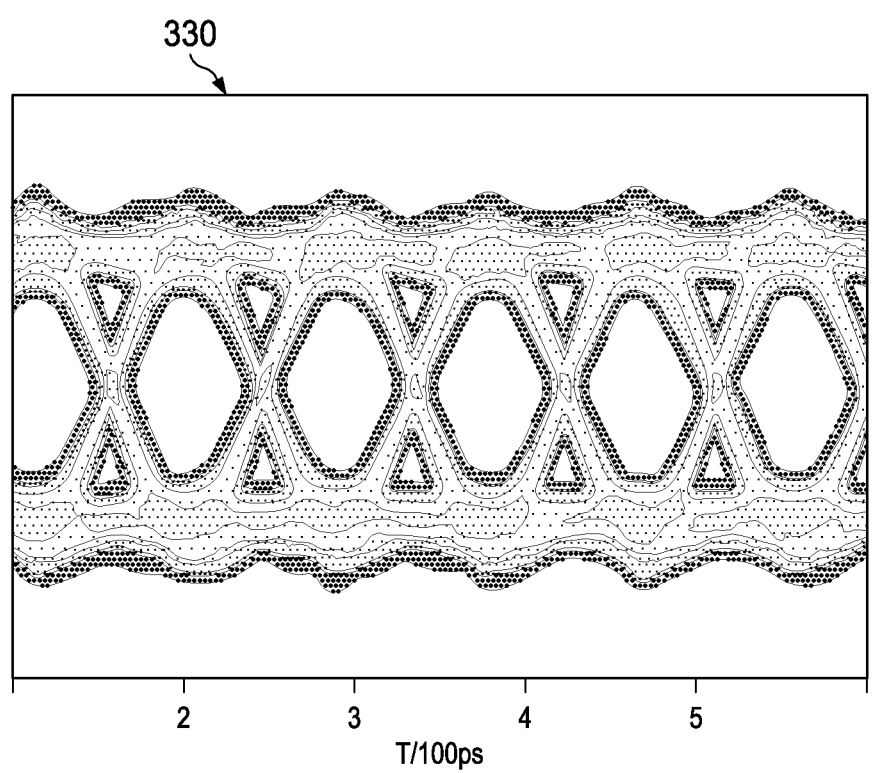

FIG. 8D illustrates graph 330 with an eye diagram of the switched signal. Because the total processing time is 130 ns, the latency for control processing is approximately 130 ns minus the switch response time minus the residual preamble time, or 103 ns. This delay can be compensated for by a 21 m fiber delay line inserted between tapped control signal and photonic switch.

Figure 9:
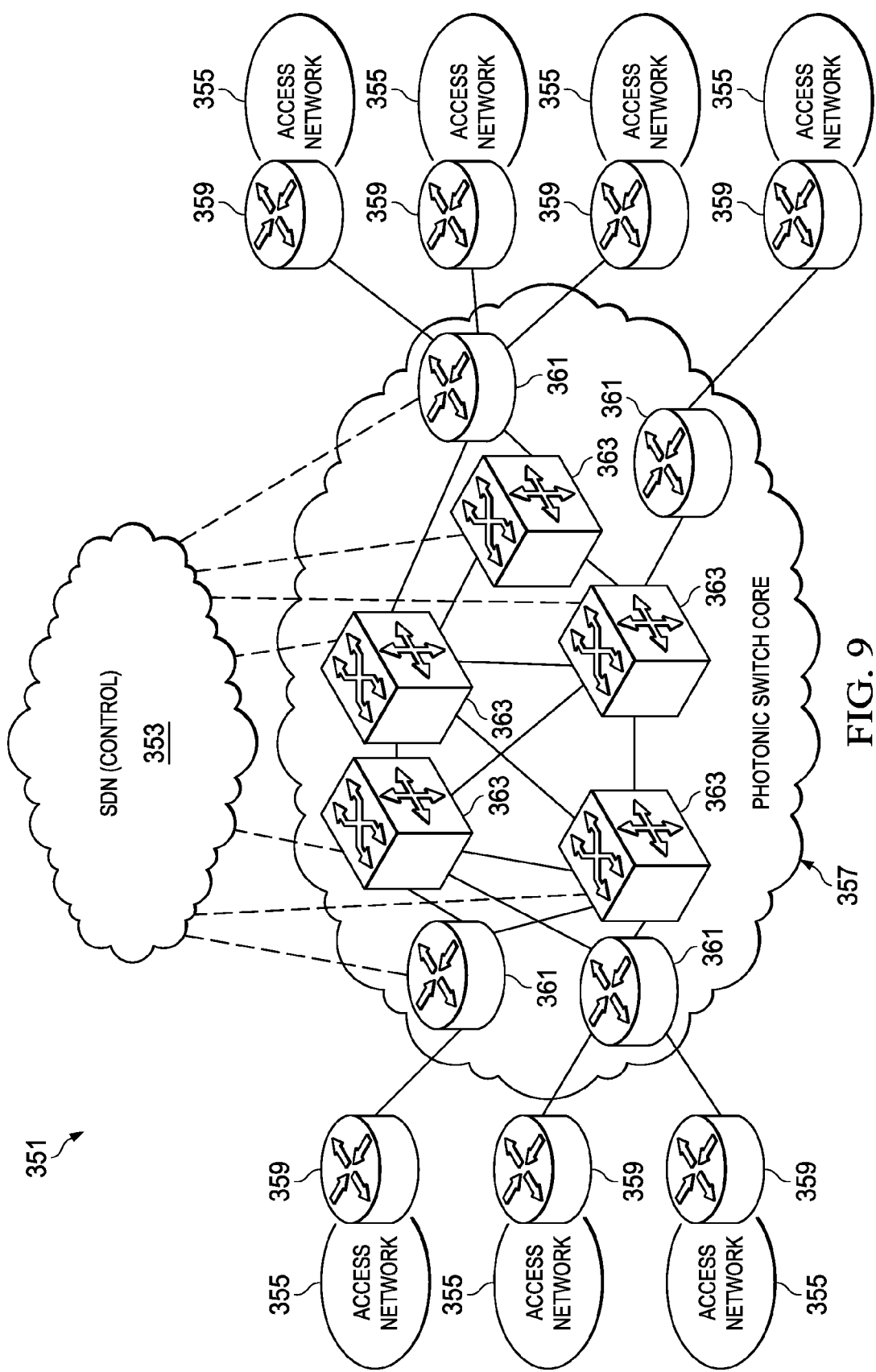
FIG. 9 illustrates an embodiment photonic switching system with software defined networking (SDN)

FIG. 9 illustrates system 351, a memory-less optical data plane with software defined networking (SDN) for photonic frame switching. System 351 has an edge buffer architecture. Routers 359 are coupled to access networks 355. Routers 359 pass packets to photonic switching core 357 for switching.

SDN controller 353 may be used for source based routing. SDN controller 353 facilitates programmable control of photonic packet switching without physical access to the photonic switches.

Photonic switching core 357 contains wrappers 361, which wrap packets to produce wrapped photonic frames. Wrappers 361 remove the IPG between packets and concatenate the packets, creating gaps between photonic frames. The gap may be about equal to the sum of the removed IPGs.

Figure 10:
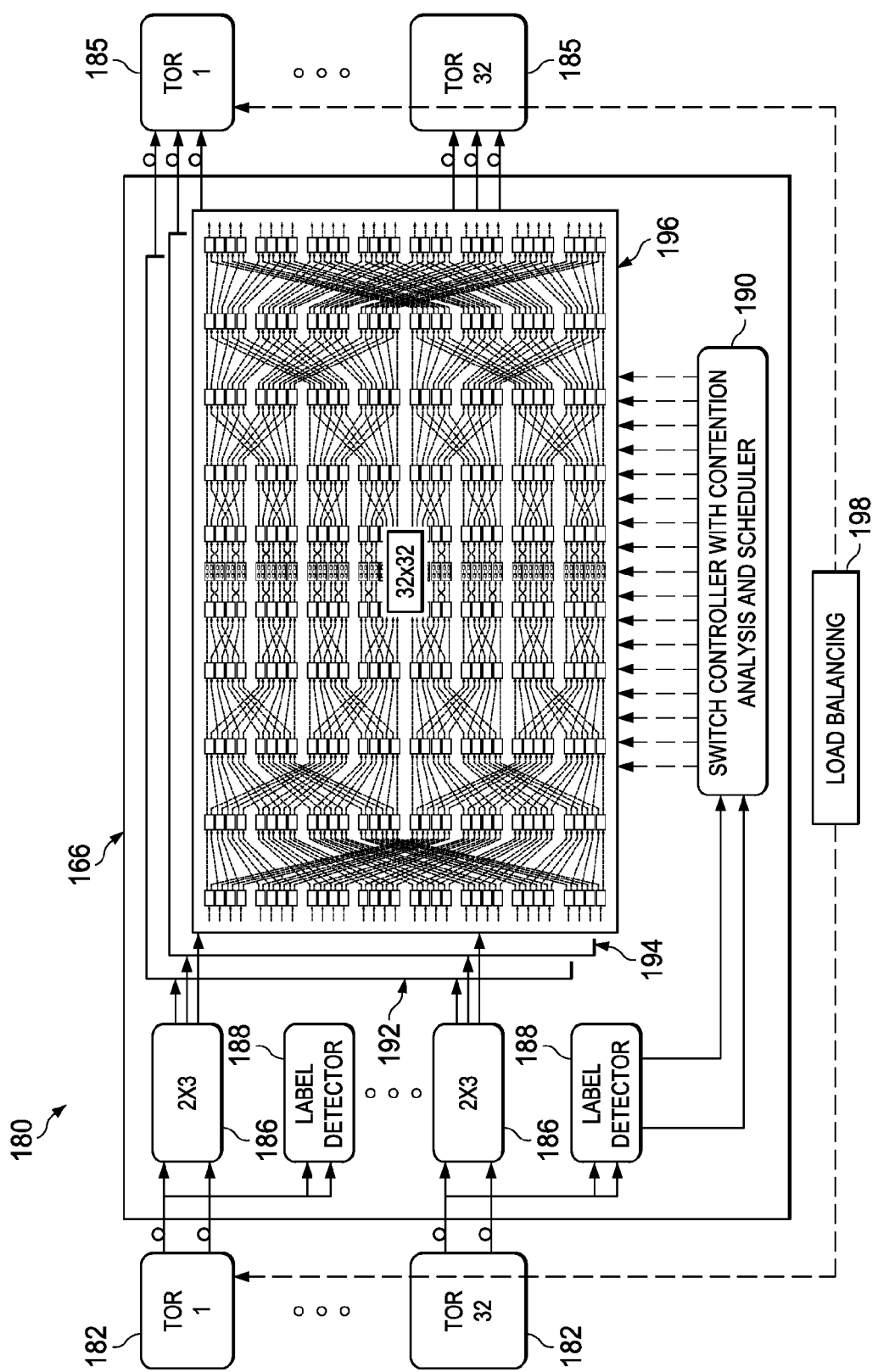
FIG. 10 illustrates an embodiment photonic switching fabric.

During the gaps between photonic frames, photonic switches 363 switch the wrapped photonic frames. Photonic switches 362 may be implemented as PICs. In one example, photonic switches are dilated SiP photonic switches with asynchronous contention control. An example photonic switching fabric is illustrated by FIG. 10, which shows photonic switching system 180, which resolves contention using deflection. Input TORs (switches or routers) 182 transmit photonic frames to photonic switching fabric 184.

Load balancing is performed by load balancing block 198. Load balancing equally utilizes the output ports to prevent lost packets. The load balancer and SDN work together to perform load balancing. When load balancing is effective, the inputs and outputs have a similar traffic distribution.

A header is sent by the source TORs in advance of the frame. In one example, the header indicates the first three choices of destination port. The label is read by label detectors 188. In one example, the destination address is wavelength encoded, where each wavelength indicates a bit for the destination address. The wavelengths have two power levels. Low power may represent a 0 and high power a 1, or vice versa.

The destination address is passed to switch controller 190. Switch controller 190 performs contention analysis and scheduling. In one example, three preferred output ports are sent to switch controller 190. Switch controller 190 determines which of the requested destination ports are available. The highest priority available destination port is approved. It is possible, but unlikely, that none of the choices are available. In this case, the wrapper is lost.

When a frame is received by photonic switching fabric 184, it is routed by photonic switches 186, 2×3 photonic switches which route the packet to the appropriate input of photonic switch 192, photonic switch 194, or photonic switch 196. Photonic switches 192, 194, and 196 may be dilated SiP photonic switches with many 32×32 silicon photonic switching fabrics. The photonic frame is then switched to the appropriate output port, and output to output TORs (or routers) 185. The frame is switched based on the decision by switch controller 190.

More details on asynchronous contention control are discussed in U.S. patent application Ser. No. 14/275,320 filed on May 12, 2014, and entitled "System and Method for Photonic Switching," which application is hereby incorporated herein by reference.

Figure 11:
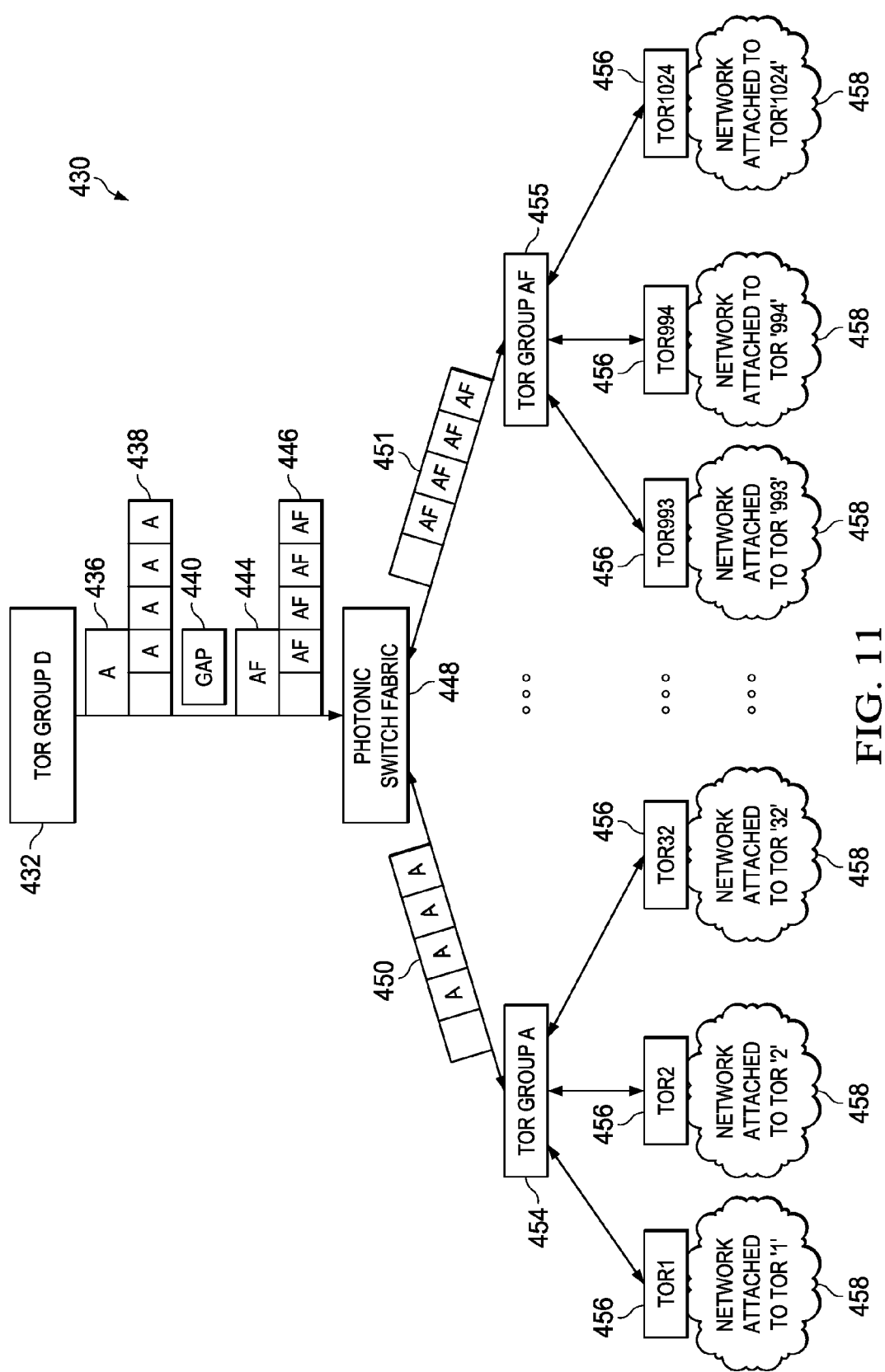
FIG. 11 illustrates an embodiment system for switching photonic packets.

FIG. 11 illustrates system 430, an architecture for wrapping packets for centralized photonic switching in a data center. A TOR group (TG) has many hosts and servers which are part of the same group address. A TOR group may be a multiplexer/demultiplexer group or a mapper/de-mapper built into an application specific integrated circuit (ASIC), or an FPGA which wraps the packets on the transmission side and unwraps the packets on the receiving side. Alternatively, a TOR group is a packet switch with integrated wrapping and unwrapping functions. A TOR group is connected to multiple TORs, and a TOR is connected to multiple servers. In one example there are, 32 TOR groups, each TOR group has 32 TORs, and each TOR is attached to 48 servers. In this example, there are 49,152 servers.

A TOR group belongs to a group address. In one example, there is a network address of 192.10.x.x/16. In this example, TOR group 1 covers network addresses from 192.10.0.0 to 192.10.7.255, TOR group 2 covers network addresses from 192.108.0.0 to 192.10.247.255, . . . , and TOR group 32 covers network addresses from 192.10.248.0.0 to 192.10.255.255. Thus, there are a total of 2048 servers in the TOR group.

Traffic from the hosts or servers of a TOR group destined for other TOR groups passes through a TOR group address filter (TAF). The TOR group looks at the destination of an IP address and determines which TOR group it belongs to by applying the address to a set of masks. In one example, the subnet address of the destination address is obtained by performing a logical AND of the IP address with a subnet or super-subnet mask.

TOR group D 432 wraps packets into wrapped photonic frames. To wrap packets, packets with the same destination are concatenated with the IPGs removed and wrapped into a frame. For example, wrapped photonic frame 434 contains packets 438 destined for TOR group A 454 with label 436 indicating this destination. Similarly, wrapped photonic frame 442 contains packets 446 destined for TOR group AF 455 and label 444 indicating this destination. Between wrapped photonic frame 434 and wrapped photonic frame 442 is gap 440.

Photonic switching fabric 448 switches the wrapped photonic packets. Photonic switching fabric 448 sets up the connections during the gap time between frames for the next frame. Photonic switching fabric 448 directs wrapped photonic frame 450 to TOR group A 454 and directs wrapped photonic frame 451 to TOR group AF 455. Photonic switching fabric 448 detects the label, routes the photonic frame to the designated output, and removes the labels.

TOR group A 454 and TOR group AF 455 receive wrapped photonic frames, unwrap then, direct them to the appropriate TOR of TORs 456. In one example, a TOR group has 32 TORs. The TORs then direct the packets to networks 458.

Figure 12:
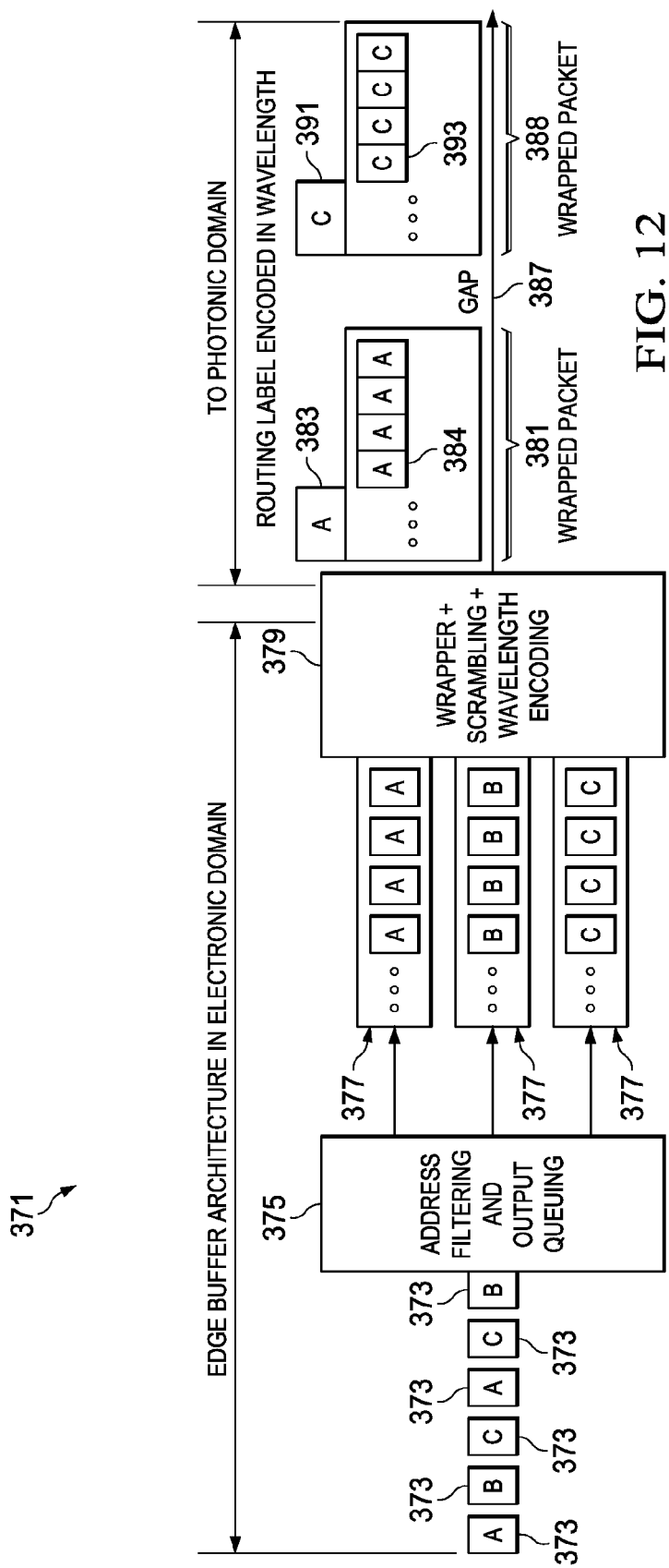
FIG. 12 illustrates an additional embodiment system for wrapping photonic packets.

FIG. 12 illustrates wrapper 371 for wrapping packets. In one example, wrapper 371 is a part of a TOR or a TOR group, such as TOR group D 432. Incoming packets 373 are destined for TOR groups. Block 375 receives the packets, performs address filtering and output queuing. Packets are filtered by destination address, for example by destination TOR or destination TOR group. The IP address is examined and mapped to a TOR group address, for example based on the destination TOR's subnet address. Packets are separated, for example based on the destination TOR group. The separated packets are placed in the appropriate queue of buffers 377. One queue contains packets for destination TOR group A, another queue contains packets for destination group B, etc.

Block 379 performs wrapping, scrambling, and wavelength encoding. When the traffic length for a queue has reached a certain sized, for example based on a defined wrap size, or the delay jitter budget for holding the packet at the head of the queue has been reached, the packets in a queue are concatenated, and an optical label is inserted. When the wrap size has not been reached, dummy packets may be added. A label is added to a wrapped photonic packet. The label may be converted from the network address. The wrapper may also be scrambled. Use of 64B/66B encoding (scrambling) schemes for photonic switching may cause severe bit error rate. This is because, unlike electronic packet switches, photonic packet switches lack electrical transceivers to maintain bit stream continuity on each their outputs. As a result, to ensure clock recovery at the receiver, a frame-based scrambling may be deployed for photonic wrappers. The scrambler may be $2^{16}-1$ pseudorandom binary sequence (PRBS) generator. The wrapped packets are converted from the electrical domain to the photonic domain. Additionally, a wavelength encoded label is added to the wrapped photonic packet. In one example, the destination address is wavelength encoded, and each wavelength indicates a bit for the destination address. The wavelengths have two power levels. Low power may represent a 0 and high power a 1, or vice versa. More details on wavelength encoding are discussed in U.S. patent application Ser. No. 13/902,085 filed on May 24, 2013, and entitled "System and Method for Multi-Wavelength Encoding," which application is hereby incorporated herein by reference.

Wrapped photonic frames 381 and 388, in the photonic domain, contain packets 384 and 393 and labels 383 and 391. The routing labels are wavelength encoded. Gap 387 lies between wrapped photonic frame 381 and wrapped photonic frame 388. In one example, the gap time is from about 10 ns to about 30 ns. In another example, gap time is engineered (for example by increasing the number of packets in a wrap) to absorb the photonic processing delays.

Figure 13:
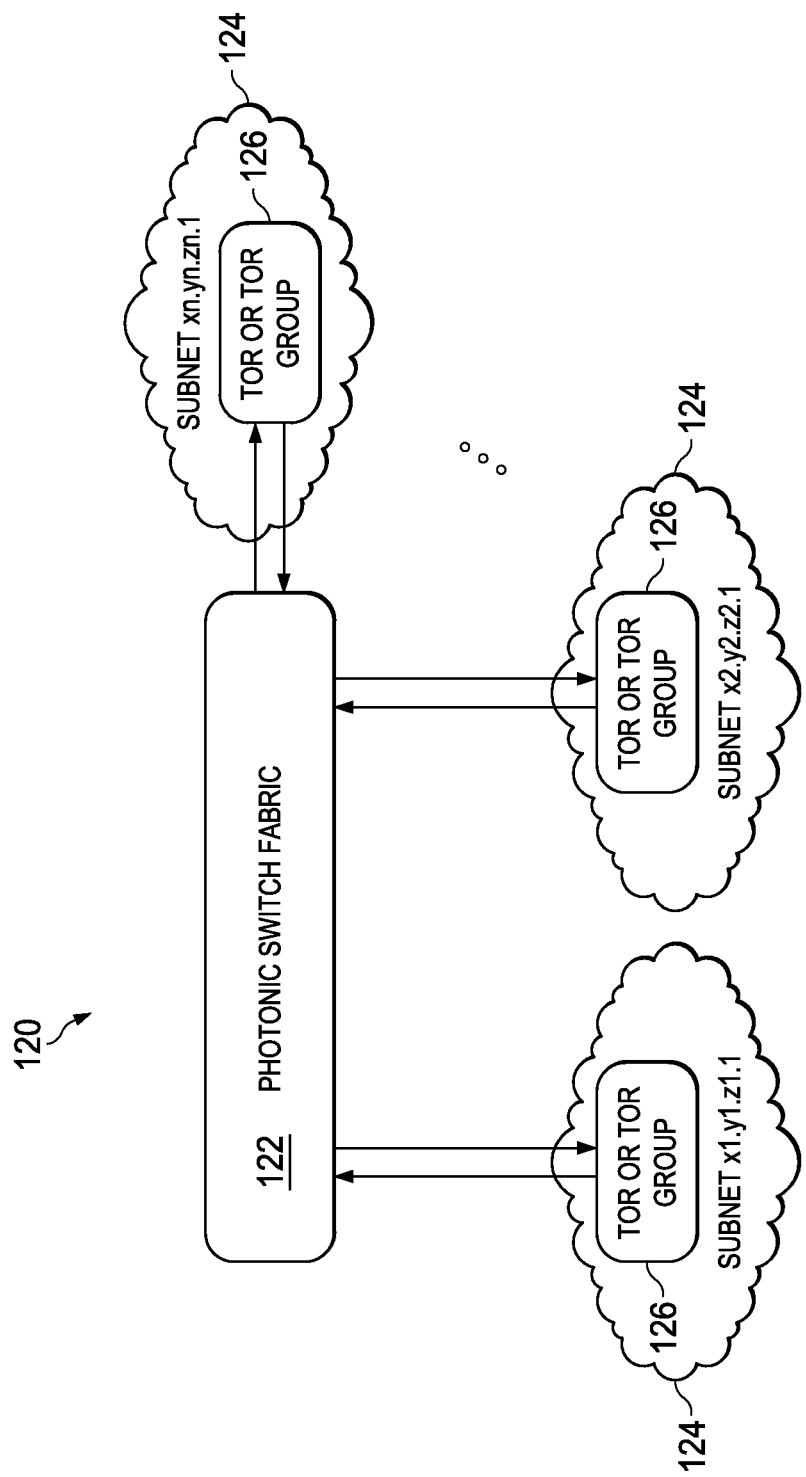
FIG. 13 illustrates an embodiment star architecture.

An architecture which may be used for centralized photonic switching is system 120 illustrated in FIG. 13. Photonic switching fabric 122 connects TORs or TOR groups 126 in a star configuration. The TORs or TOR groups are assigned a group address. TORs or TOR groups 126 are connected to subnets 124. In an example, a packet wrapping scheme with a fixed wrapper size is used. A TOR group encodes the destination TOR group address into an optical label associated with that address. Broadcast and multicast of the traffic are performed with a TAF, where the packet is replicated to the destination addresses which belong to a member of a multicast group. In multicasting, multiple copies of the traffic are provided at a packet level to destination TOR groups.

Figure 14:
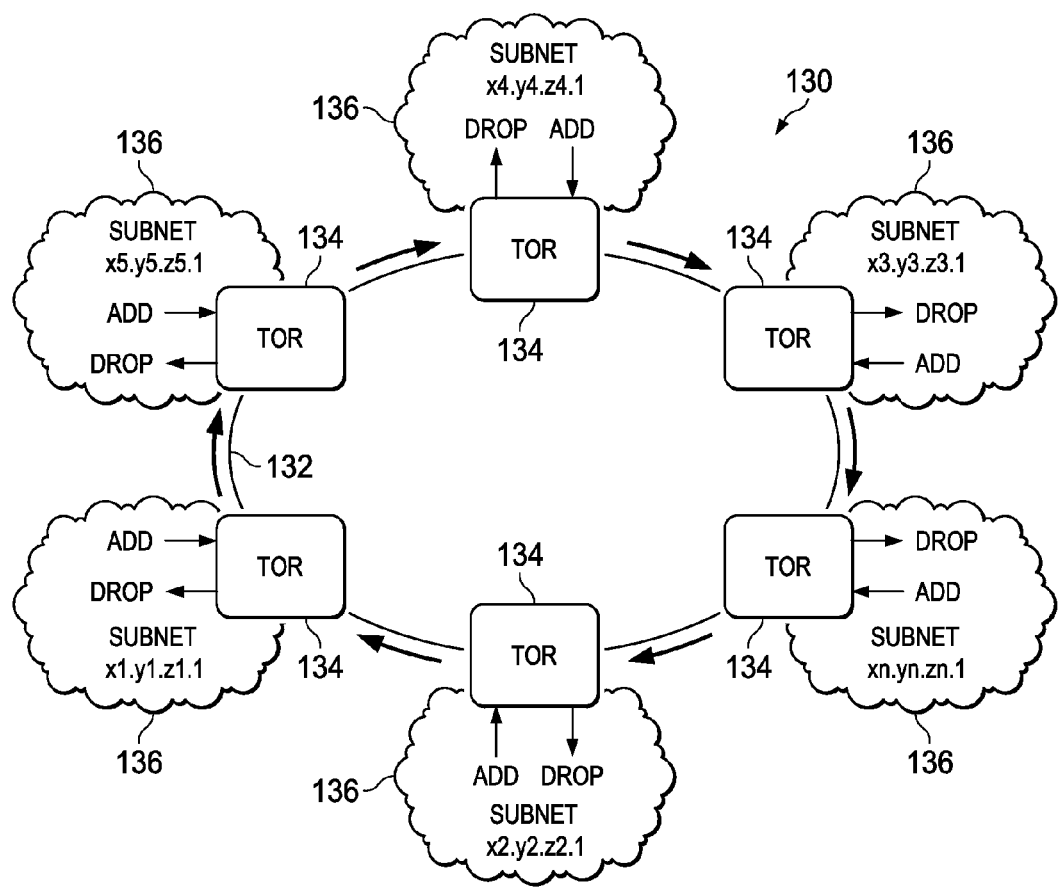
FIG. 14 illustrates an embodiment ring architecture.

In another example, illustrated by system 130 in FIG. 14, a ring architecture is used. Photonic switching may be synchronous or asynchronous. TORs 134 are connected to each other in a ring by high capacity photonic ring 132. Also, TORs 134 are connected to subnets 136, which are clouds. In one example, high capacity photonic ring 132 has a bandwidth of 1.28 Tbps. For example, high capacity photonic ring 132 may be stacks of rings, where each ring has a rate of 100 Gbps, 200 Gbps, or 400 Gbps. Each node, for example a TOR or TOR group, inserts its wrapped traffic when it sees an empty photonic label. The node inserts the wrap and replaces the empty optical label with a wrap destination.

The nodes use a network address which is mapped to an optical label. The signaling waveband carries both routing and management information. Because the number of nodes in a ring is limited, a limited number of wavelengths may be used for addressing the TORs. For example, assuming transceivers operate in 12 wavelengths in the 1550 nm range, some of the wavelengths may be used to address ring nodes and some are used for management and control. The signaling waveband may also carry other control signals, such as congestion status, fairness, and management. In one example, an asynchronous mode of operation is used for photonic ring 132. In the asynchronous mode, the gap may be fixed to the time for performing switching and control. However, wrap size could vary. In another example, OTDM and synchronous mapping are used.

In a synchronous example, there is one wrap in each time slot, where the wrap time is fixed and equal to the slot time. The gap time is used to configure the photonic switch. The node determines whether a frame is destined for that node. When the frame is destined for that node, the node takes the frame and unwraps it. When the node is not destined for that node, the packet continues around the ring.

Figure 15:
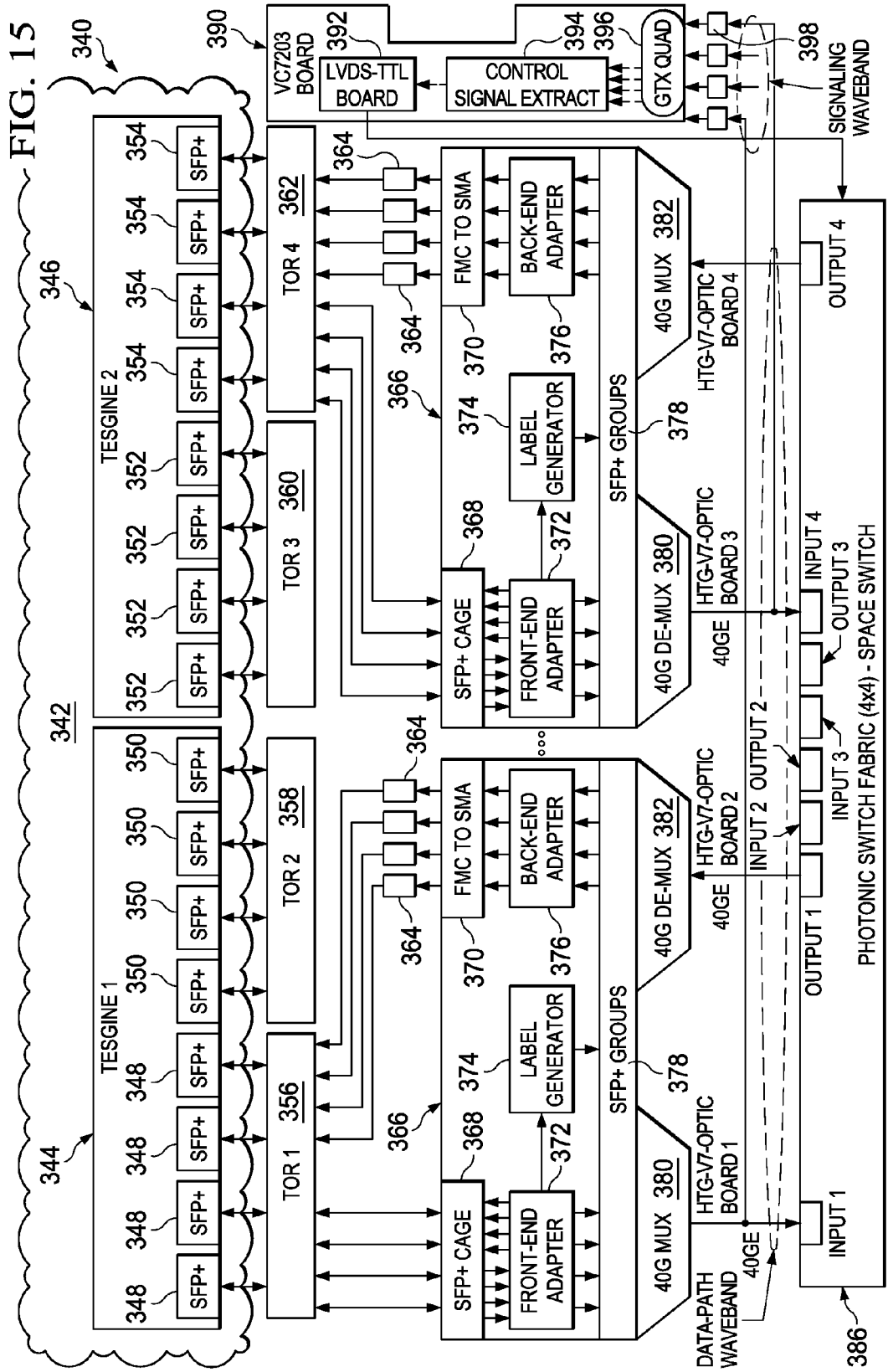
FIG. 15 illustrate an embodiment system for wrapper photonic frames in a centralized photonic switching fabric.

FIG. 15 illustrates system 340, an embodiment photonic switching system that uses optical space switching. System 340 is a bufferless photonic switch which uses a photonic wrapper. Separate wavebands are used for the control signal path and the payload data path. Photonic routing labels are used on the forward path between TORs (or switches) and the photonic switch. Signaling on the return path (between photonic switch and TORs) is used for contention control and synchronization.

Server network 342 is simulated by simulator 344 and simulator 346. Simulators 344 and 346 contain small form factor pluggable transceivers (SFPs) 348, 350, 352, and 354, which are connected to TORs 356, 358, 360, and 362. The signals are sent to FPGA 366.

In FPGA 366, signals are received by SFP 368. These signals are proceed by front-end adaptor 372. Labels are generated by label generator 374. The signals and groups are output by SFP 378 to photonic switching fabric 386 and FPGA 390.

The optical signal of the labels is converted to an electrical signal by optical-to-electrical converters 398, and is received by FPGA 390. They are processed by processor 396. Then, the control signal is extracted by control signal extractor 394. The control signals are then converted by low-voltage differential signal (LVDS) to transistor-transistor logic (TTL) board 392.

The data wave path signals and the signaling wave path signals are multiplexed by multiplexer 380, with data at 40GE and signaling at 10GE, and output to photonic switching fabric 386. The control signals from FPGA 390 are also input to photonic switching fabric 386. Photonic switching fabric 386 is a 4×4 optical space switch which operates on a dedicated waveband. The signals are switched, and output to FPGA 366.

The signals are received by demultiplexer 382 and SFP 378. They are processed by back-end adaptor 376. The signals are converted by FPGA mezzanine card (FMC) to subminiature version A (SMA) converter 370. The signals are converted to optical signals by electrical-to-optical converters 364, and proceed to TORs 356, 358, 360, and 362.

Figure 16:
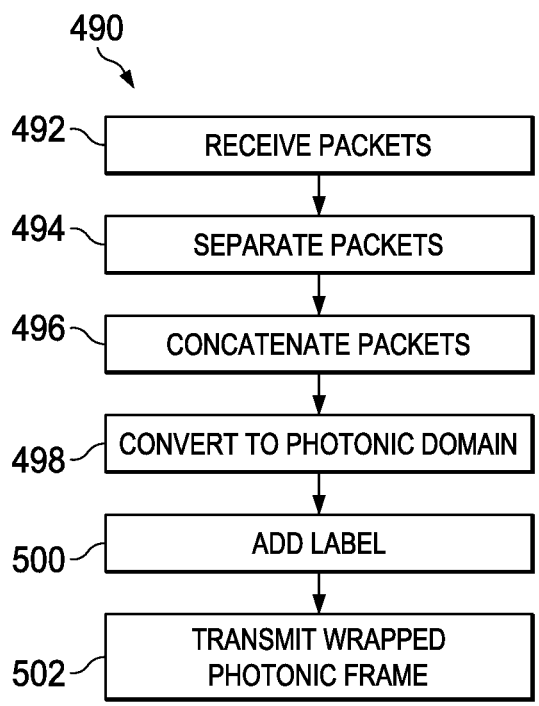
FIG. 16 illustrates a flowchart for an embodiment method of wrapping packets.

FIG. 16 illustrates flowchart 490 for a method of wrapping photonic packets. Initially, in step 492, packets are received by a node, for example a TOR or TOR group. The packets may be received from a server or network. The received packets are in the electrical domain, with an IPG between packets, for example in an IP format.

Next, in step 494, the packets are separated into queues. In one example, packets are separated by destination TOR or TOR group. Packets are directed to one of several buffers corresponding to the destination. In another example, packets are placed in a buffer based on the path they travel, e.g., source based routes.

In step 496, the packets are concatenated. When a buffer is full, or a maximum period of time has passed, the packets are read out of the buffer. If the buffer is not full, padding may be added so the wrapped packets are of a uniform length. There is no IPG between the packets when they are read out of the buffer. After a wrapped photonic frame is read out of one buffer, the next wrapped photonic packet is read out of another buffer after a gap time. The gap time may be the sum of the IPGs which have been removed. In one example, it is from about 10 ns to about 30 ns. The gap time may be chosen based on the time to set up the photonic switch, and the time for the switching function.

Then, in step 498, the wrapped frame is converted from the electrical domain to the optical domain. This may be done using electrical-to-optical converters. A designated traffic wavelength may be used.

A label is added to the wrapped photonic packet in step 500. In one example, the label is added in the same wavelength as the traffic wavelength. In this case, the label may be added before the gap. Alternatively, the label is added at a different wavelength than the traffic wavelength. For example, the label may be wavelength encoded, where the presence or absence of light is a wavelength indicates an address bit.

Finally, in step 502, the wrapped photonic frame is transmitted to a photonic switch. This may be done along an optical fiber.

Figure 17:
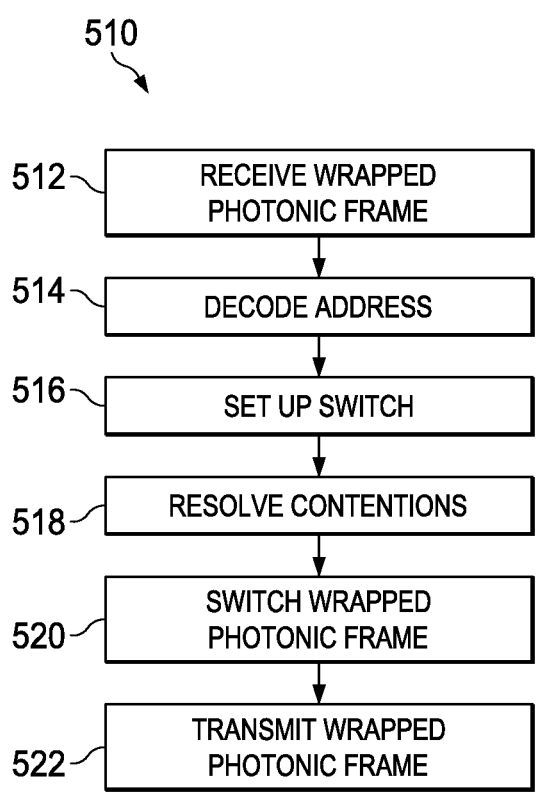
FIG. 17 illustrates a flowchart for an embodiment method of switching wrapped photonic frames.

FIG. 17 illustrates flowchart 510 for a method of switching wrapped photonic frames. Initially, in step 512, a photonic switching fabric receives a wrapped photonic frame from a node. The photonic switching fabric may contain an optical photonic switch.

In step 514, the photonic switching fabric decodes the label to obtain destination address for the wrapped photonic frame. In one example, the address indicates the destination node for the wrapped photonic frame. In one example, the address is decoded as ones or zeroes based on the presence or absence of light in the timeslot. Alternatively, the address is wavelength encoded. To decode a wavelength encoded address, wavelengths are separated, and the presence or absence of light is detected, to indicate address bits. In one example, in a ring configuration, the photonic switching fabric determines whether the wrapped photonic frame is destined for that node. When the wrapped photonic frame is not destined for that node, it continues along the ring. When the wrapped photonic frame is destined for that node, the photonic switching fabric siphons it from the ring, and switches it towards its destination.

Next, in step 516, the photonic switch is set up during the gap. The connections of the photonic switch are set up during the gap time based on the destination address. In one example, the photonic switch is a silicon photonic switch.

Then, in step 518, contentions are resolved. Contentions may be synchronously resolved, for example using slotted system in which contending sources transmit in different time slots. Several choices of output port may be considered. Then, the wrapped photonic frame is directed to one of the available output port.

In step 520, the wrapped photonic frame is switched by the photonic switch. Connections in the photonic switch are maintained for the duration of the photonic frame. After the photonic frame is switched, the photonic switch sets up for the next wrapped photonic frame during the next gap time.

Finally, in step 522, the photonic switch transmits the switched wrapped photonic frame to a node. The wrapped photonic frame may be transmitted to a destination TOR or TOR group or to the next hop in the network. It may be transmitted along an optical fiber.

Figure 18:
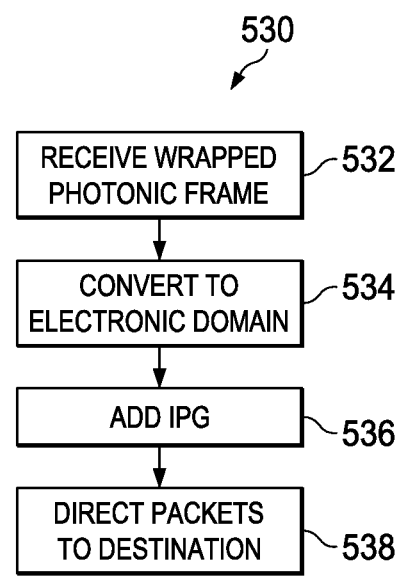
FIG. 18 illustrates a flowchart for an embodiment method of unwrapping packets.

FIG. 18 illustrates flowchart 530 for a method of unwrapping a wrapped photonic frame. Initially, in step 532, a node receives a wrapped photonic frame from a photonic switching fabric. The node may be a TOR or TOR group.

Next, in step 534, the node converts the wrapped photonic frame to the electrical domain. This may be done by optical-to-electrical converters.

Then, in step 536, the IPGs are put back between the packets. This may be done by reading the received frame into a buffer. Then, the packets are read out from the buffer, with an IPG between the packets.

Finally, the packets are directed to their destinations in step 538. A TOR group may direct the packets to the appropriate TOR. A TOR may direct the packets to the appropriate subnet or server.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of wrapping photonic packets, the method comprising:
    receiving, by a node, a first packet;
    receiving, by the node, a second packet;
    concatenating the first packet and the second packet to produce a concatenated frame, wherein concatenating the first packet and the second packet comprises removing an inter-packet-gap (IPG) between the first packet and the second packet, and wherein concatenating the first packet and the second packet further comprises writing the first packet to a buffer, writing the second packet to the buffer, and reading out the buffer to produce the concatenated frame; and
    converting the concatenated frame to a photonic frame, wherein the concatenated frame is an electrical frame.

2. The method of claim 1, further comprising adding a label to the photonic frame to produce a first wrapped photonic frame.

3. The method of claim 2, wherein the photonic frame and the label are at a traffic wavelength.

4. The method of claim 2, wherein the photonic frame is at a traffic wavelength and the label is in a control waveband.

5. The method of claim 4, wherein the label is wavelength encoded.

6. The method of claim 2, further comprising transmitting, by the node to a photonic switch, the first wrapped photonic frame.

7. The method of claim 2, further comprising:
    determining a destination address of the first wrapped photonic frame;
    setting up a connection in a photonic switch during a gap time between the first wrapped photonic frame and a second wrapped photonic frame; and
    switching the first wrapped photonic frame after setting up the connection in the photonic switch.

8. The method of claim 7, further comprising transmitting the first wrapped photonic frame to a second node in accordance with the destination address, after switching the first wrapped photonic frame.

9. The method of claim 7, wherein determining the destination address comprises determining the destination address in accordance with a wavelength encoded label of the first wrapped photonic frame.

10. The method of claim 7, further comprising determining whether the destination address corresponds to a second node associated with a photonic switching fabric, wherein switching the first wrapped photonic frame comprises:
    directing the first wrapped photonic frame to the second node when the destination address indicates the second node; and
    directing the first wrapped photonic frame to a third node when the destination address does not indicate the second node.

11. The method of claim 2, further comprising:
    unwrapping the first wrapped photonic frame to produce a third packet and a fourth packet, wherein unwrapping the first wrapped photonic frame comprises adding an inter-packet-gap (IPG) between the third packet and the fourth packet; and
    directing the third packet to a destination.

12. The method of claim 11, wherein directing the third packet to the destination comprises routing the third packet to a subnet.

13. The method of claim 1, wherein the node is a top-of-rack (TOR) switch.

14. The method of claim 1, wherein the node is a switch or a router.

15. The method of claim 1, wherein the node is a TOR group.

16. The method of claim 1, further comprising:
    determining a first destination group of the first packet;
    determining a second destination group of the second packet; and
    determining whether the first destination group equals the second destination group, wherein concatenating the first packet and the second packet is performed when the first destination group equals the second destination group.

17. The method of claim 16, wherein the first destination group indicates a destination TOR.

18. The method of claim 16, wherein the first destination group indicates a destination TOR group.

19. The method of claim 1, wherein reading out the buffer occurs when the buffer is full.

20. The method of claim 1, wherein reading out the buffer occurs after a set period of time from writing the first packet to the buffer.

21. The method of claim 20, further comprising padding the first packet from the buffer.

22. The method of claim 1, wherein the concatenated frame comprises an idle period.

23. A method of wrapping photonic packets, the method comprising:
receiving, by a node, a first packet;
receiving, by the node, a second packet;
determining a first destination group of the first packet;
determining a second destination group of the second packet;
determining whether the first destination group equals the second destination group;
concatenating the first packet and the second packet to produce a concatenated frame, wherein concatenating the first packet and the second packet comprises removing an inter-packet-gap (IPG) between the first packet and the second packet, and wherein concatenating the first packet and the second packet is performed when the first destination group equals the second destination group; and
converting the concatenated frame to a photonic frame, wherein the concatenated frame is an electrical frame.

24. A method of wrapping photonic packets, the method comprising:
receiving, by a node, a first packet;
receiving, by the node, a second packet;
concatenating the first packet and the second packet to produce a concatenated frame, wherein concatenating the first packet and the second packet comprises removing an inter-packet-gap (IPG) between the first packet and the second packet;
converting the concatenated frame to a photonic frame, wherein the concatenated frame is an electrical frame;
adding a label to the photonic frame to produce a first wrapped photonic frame;
determining a destination address of the first wrapped photonic frame;
setting up a connection in a photonic switch during a gap time between the first wrapped photonic frame and a second wrapped photonic frame; and
switching the first wrapped photonic frame after setting up the connection in the photonic switch.

* * * * *